(No Model.)
B. KINN.
DEVICE FOR FORCING AIR INTO KEGS CONTAINING LIQUIDS.
No. 431,592. Patented July 8, 1890.
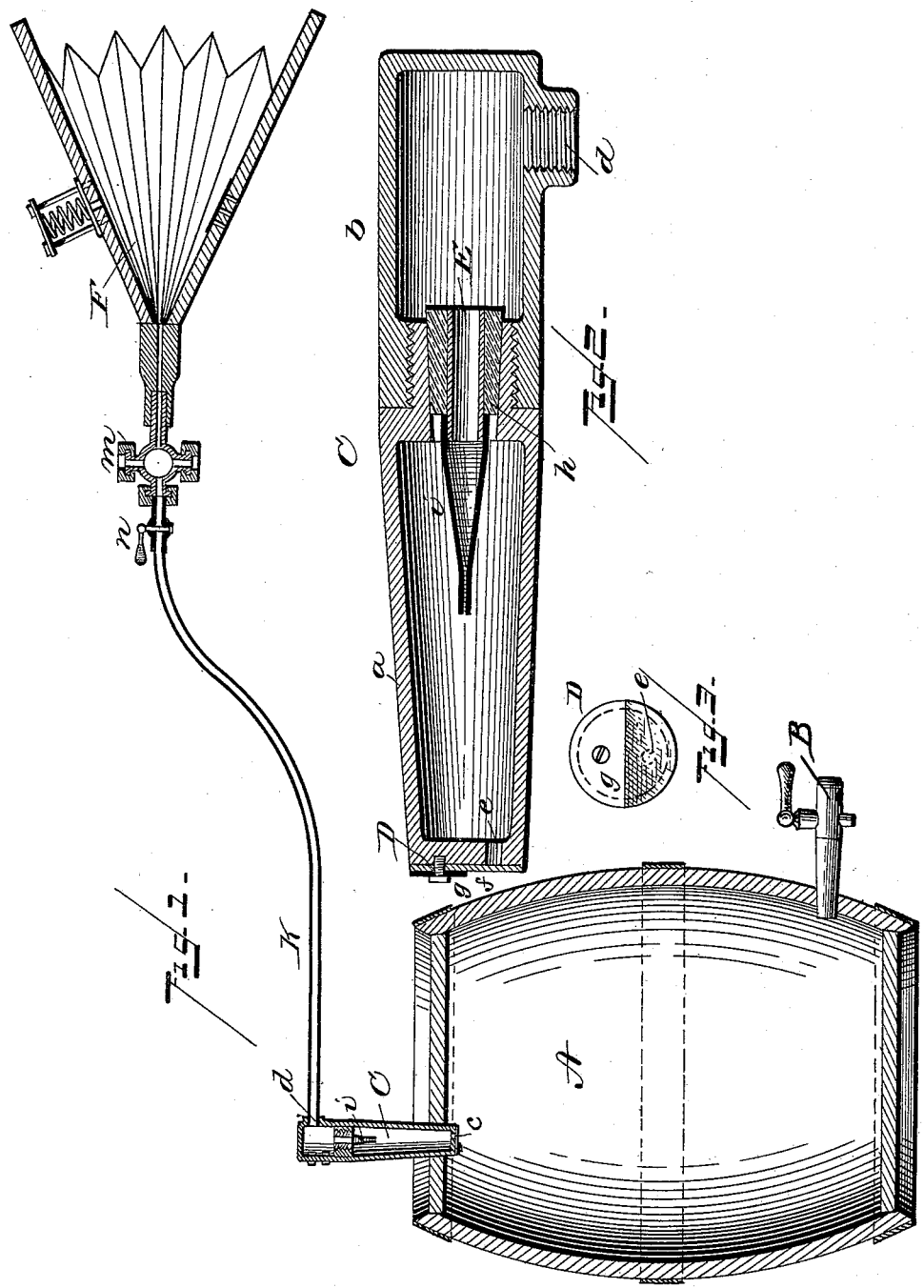
WITNESSES
F. L. Durand
H. M. Sterling
INVENTOR
B. Kinn
BY
L. W. Pinsabaugh
Attorney

UNITED STATES PATENT OFFICE.

BABTIS KINN, OF DUNKIRK, NEW YORK.

DEVICE FOR FORCING AIR INTO KEGS CONTAINING LIQUIDS.

SPECIFICATION forming part of Letters Patent No. 431,592, dated July 8, 1890.

Application filed July 29, 1889. Serial No. 319,061. (No model.)

*To all whom it may concern:*

Be it known that I, BABTIS KINN, a citizen of the United States, residing at Dunkirk, in the county of Chautauqua and State of New York, have invented new and useful Improvements in Devices for Forcing Air into Kegs Containing Liquids; and I do hereby declare the following to be a full, clear, and exact description of said invention, reference being had to the accompanying drawings, and to the letters of reference marked thereon, which form a part of this specification.

My invention relates to improvements in devices for forcing air into beer-kegs or barrels containing liquids to facilitate the drawing off of the liquids and also to preserve the same by the presence of air.

My invention has for its object the construction of a device for forcing the air into kegs or barrels containing liquids; and it consists in a peculiarly-constructed valved tube, to which is connected a suitable bellows by means of a pipe or hose leading therefrom.

My invention also consists in certain other details, which will be fully hereinafter explained and pointed out in the claim.

Referring to the drawings, Figure 1 is a view of my device as attached to a keg, all of which is shown in section. Fig. 2 is a sectional view of the vent-tube, showing the valves therein. Fig. 3 is a view of the inserted end of the tube.

A indicates a barrel or keg having the spigot B therein and the vent-tube C driven in the hole in the head of the keg or barrel. The vent-tube C, which constitutes a prime feature of my invention, is composed of wood or any other suitable material, and consists of the portions $a$ and $b$. The portion $a$ is a rubber tube, (designated by the letter $i$,) said tube being made of soft rubber and having its point drawn out in a small tube, which admits air into the portion $a$, but so sensitive as to bend or close when back-pressure is exerted upon it, and thereby providing against the escape of air from the keg. Connected to the vent-tube at the opening $d$ is a pipe or hose $k$, which communicates with a bellows F.

The bellows may be of any ordinary construction or may be worked by hand or by foot pressure.

An attachment or coupling $m$, having connections for several pipes leading to other kegs, is affixed to the mouth-piece of the bellows, and each pipe $k$ is provided with a stopcock $n$ near the coupling device, whereby the same may be cut off from the bellows when desired.

The operation of my device is as follows: When air is forced into the vent-tube C at $d$, it forces the mouth of the rubber tube $i$, forming the intermediate valve open, and also opens the valve D, both valves resisting the pressure of air forced into the keg; but should any escape through the valve D the valve E, which is made more sensitive, will close on the slightest back-pressure. As before stated, the bellows may be operated by the foot, and when such is the case it can be conveniently placed under the bar, and the liquor in the kegs can without any trouble be kept under a constant pressure, or the vent may be used without the bellows-tube having the inlet-valve D at one end and the valve E at the other, both opening downward or into the keg. The portion $a$ is also screw-threaded at one end to engage the internal screw-threads in the portion $b$, which is also provided with the screw-threaded opening $d$ near its closed end, to which a connection can be made with the bellows which forces air therethrough. The end of the vent-tube C, in which the valve D is located, is closed with the exception of a small opening $e$ made therein near one side of the tube. On the end of the tube and over the opening $e$ is secured a disk or diaphragm of soft rubber $f$, which corresponds to the size of the circular end of the tube, or it may be smaller. This flexible disk is fastened to one side of the end and opposite the opening $e$ by a semicircular plate of metal having a screw extending through into the end of the tube, thereby clamping the disk at one side rigidly to the tube, but allowing the free side of the same to yield outward when air is admitted or forced through the tube through the opening $d$. The intermediate valve E is also secured to the portion $a$, but differs entirely in its construction from the valve D. The opening in this portion of the tube is made tapering to receive the tapering tube $h$ and hold the same securely therein. The tapering end of the tube $h$ is also provided with a shoulder adapted to receive the large end of a conically-shaped vent to admit air as the liquor is drawn off, but allowing none to escape.

What I claim, and desire to secure by Letters Patent, is—

A valved bung consisting of two parts, one part $a$ provided with an internal valve at one end and an external valve at the other, and provided with screw-threads on one end to receive the cap or portion $b$, substantially as set forth.

In testimony whereof I affix my signature in the presence of two subscribing witnesses.

BABTIS KINN.

Witnesses:
J. C. BRECHT,
PAULINE POLINSKI.